United States Patent [19]

Holdren et al.

[11] Patent Number: 4,823,305

[45] Date of Patent: Apr. 18, 1989

[54] SERIAL DATA DIRECT MEMORY ACCESS SYSTEM

[75] Inventors: Earl J. Holdren, Windsor, Canada; Alexander J. Owski, Redford, Mich.

[73] Assignee: Chrysler Motors Corporation, Highland Park, Mich.

[21] Appl. No.: 203,620

[22] Filed: May 26, 1988

Related U.S. Application Data

[63] Continuation-in-part of Ser. No. 887,013, Jul. 18, 1986, abandoned.

[51] Int. Cl.⁴ .............................................. G06F 3/04
[52] U.S. Cl. ..................................................... 364/900
[58] Field of Search ... 364/200 MS File, 900 MS File; 370/1; 360/5

[56] References Cited

U.S. PATENT DOCUMENTS

| | | | |
|---|---|---|---|
| 4,075,691 | 2/1978 | Davis et al. | 364/200 |
| 4,168,469 | 10/1979 | Parikh et al. | 364/900 X |
| 4,225,919 | 9/1980 | Kyu et al. | 364/200 |
| 4,298,959 | 11/1981 | Sundermeyer et al. | 364/900 |
| 4,424,565 | 1/1984 | Larson | 364/200 |
| 4,453,229 | 6/1984 | Schaire | 364/900 |
| 4,488,226 | 12/1984 | Wagner, Jr. et al. | 364/200 |
| 4,538,224 | 8/1985 | Peterson | 364/200 |
| 4,638,497 | 1/1987 | Komatsu et al. | 358/142 X |
| 4,658,294 | 4/1987 | Park | 358/142 |

OTHER PUBLICATIONS

Intel Microprocessor and Peripheral Handbook, 1982, pp. 2-88 to 2-102 entitled High Performance Programmable DMA Controller.

Primary Examiner—Thomas M. Heckler
Assistant Examiner—Paul Kulik
Attorney, Agent, or Firm—Wendell K. Fredericks

[57] ABSTRACT

A serial data direct memory access system including a control circuit that shares control with a master computer of an interface bus of a DMA storage system. Serial data is supply to the control circuit via a fiber optic cable. The control circuit employs means responsive to status code bits of the message words for gaining control from the master computer of the interface bus and for directly accessing the computer controlled bus memory storage system. This system is capable of handling data streams of infinite lengths. Also, means are provided for preventing bit errors from interfering with critical message words.

6 Claims, 1 Drawing Sheet

SERIAL DATA DIRECT MEMORY ACCESS SYSTEM

This application is a continuation-in-part, of application Ser. No. 06/887,013, filed 7/18/1986, now abandoned.

BACKGROUND OF THE INVENTION

1. Field of the Invention

The present invention relates generally to novel data storage systems and particularly to direct memory access techniques for storing serial point to point digital encoded data such as those used in the fiber optic multiplexed data acquisition system described in copending application Ser. No. 887,682, filed July 21, 1986 to the present inventors, Earl J. Holdren and Alexander J. Owski entitled "Fiber Optic Multiplexed Data Acquisition System" now U.S. Pat. No. 4,707,823 dated Nov. 17, 1987.

2. Description of the Prior Art:

Multichannel digital data acquisition systems which require transferring data from illustratively a hostile environment to a less hostile environment must have means for capturing and storing transient data. Usually, such systems are devised for capturing and storing translient response information derived during events such as blasting, ballistics, and crash testing. When many channels of data are required, for example, sixty four channels of data, and if the digital data to be transferred is parallel data, having a word size illustratively of 16 bits, then 16×64 16 x or 1024 separate parallel lines would be necessary.

To convert the sixty-four channels of parallel data to serial data and then transfer the data to a remote location, reconstruct the data to parallel words and then store the parallel words, presents problems with respect to coordination and circuit noise which could distort the transferred data. Most prior art direct memory access systems, to allow orderly communication between transmitters and receivers in a data link, employ well-defined protocol for management of data. Protocols are used to perform functions such as establishing and terminating messages between two stations, identifying the sender and receiver, acknowledging received information, and initializing stations. Also, in order to permit utilization of various communications systems, accepted standard protocol is normally empolyed. Generally, data communications systems are designed around accepted bit or byte oriented standard protocol such as Synchronous Data Link Control (SDLC) and Binary Synchronous Communication (BSC). SDLC is a bit oriented protocol in which any size data word may be transmitted. It has very flexible provisions for message switching and error control. Communications in the bit oriented protocols usually are in the form of frames of uniform format. The frames comprise a number of fields each having a definite location and precise meaning. BSC is byte oriented, requiring data to be transmitted in multiples of eight bits. Transmission of information in BSC form is usually limited to half-duplex (two-way alternate). This results from the stop-and-wait procedure which characterizes such protocol. Once a communications channel is established and the transmitter sends one block, it stops and waits for an acknowledgement signal before sending another block.

To accommodate the standard protocols, receiver components are designed to respond to the characters presented in the formats. This often entails designing circuits to respond to separate words of routing, destination addressee, and time of origination information or to separate frames of opening flag, address field, control field, information field, frame check sequence field and closing flag information. Devotion of an extensive amount of circuitry to comply with the protocol also slows data communication between the transmitter and receiver and often limits the amount of data that can be processed.

A search was made for means of transferring a series of digital data words representations from one point to a remote transient data recorder that is not burden with responding to extensive protocol requirements. The search resulted in the serial data direct memory access system of the present invention.

SUMMARY

The instant invention comprises a direct memory access system which handles point to point transfer of serial data of serial data from transient response detection systems. The systems may be the type which convert analog signals from multichannel inputs and convert each channel data into digital message words codes defining the data are assigned to each word and each word is transferred from the multichannel system over optics cable to the direct memory access system. The protocol for the digital message words transmitted to the direct memory access system of this invention includes routing information encoded in the message word itself. The message words, which are Manchester encoded for transmission over a fiber optic data link, in an embodiment of this invention, comprises 17 bits including a START bit, four code bits and 12 data bits. The code bits are used primarily for indicating data that is developed just prior to the transient response, data representing the triggered transient response and data that results just after the transient the transient response. An infinite number of message words may be processed by direct memory access systems of this invention.

Within the direct memory access system are means for reconstructing the incoming serial data words and codes to parallel data. Means are also provided for forming and assigning addresses to each word that is to be stored and then directly storing each word in memory at a higher rate than the serial transfer data.

The system also includes a master computer that controls an interface bus system that has an expandable memory. The direct memory access system shares control of accessing the expandable memory with the master computer. The direct memory access system provides means for transferring the converted parallel message data to the assigned address locations of the expandable memory. When the system of this invention is accessing the expandable memory, the master computer goes to sleep.

BRIEF DESCRIPTION OF THE DRAWING

The accompanying drawing, which is incorporated in and constitutes a part of this specification, illustrates a preferred embodiment of the invention and, together with the description, serves to explain the principles of the invention.

DESCRIPTION OF THE PREFERRED EMBODIMENT

Figure 1:
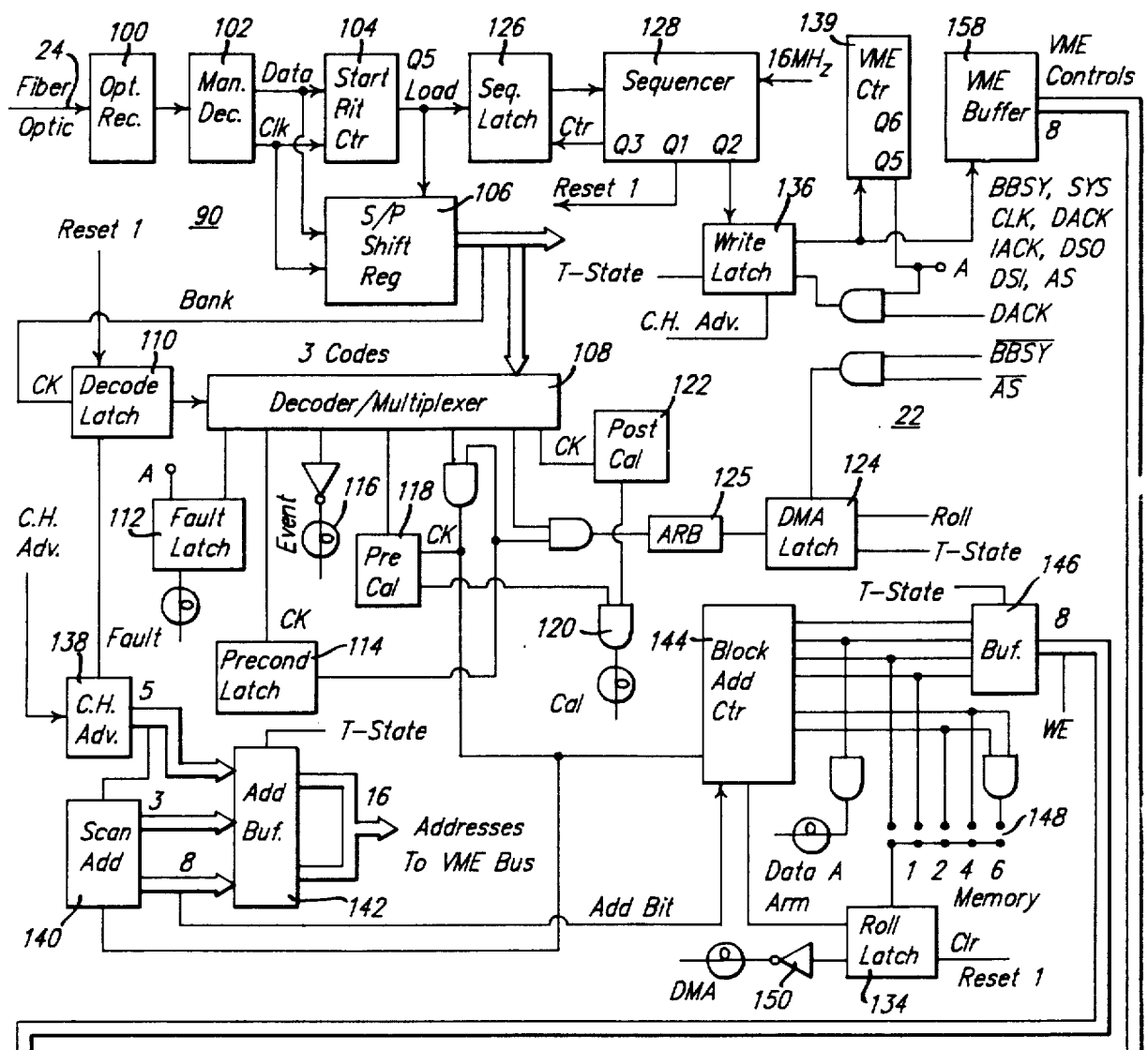
FIG. 1 is a bock diagrammatic view of a preferred embodiment of the serial data direct memory access system.
Figure 1:
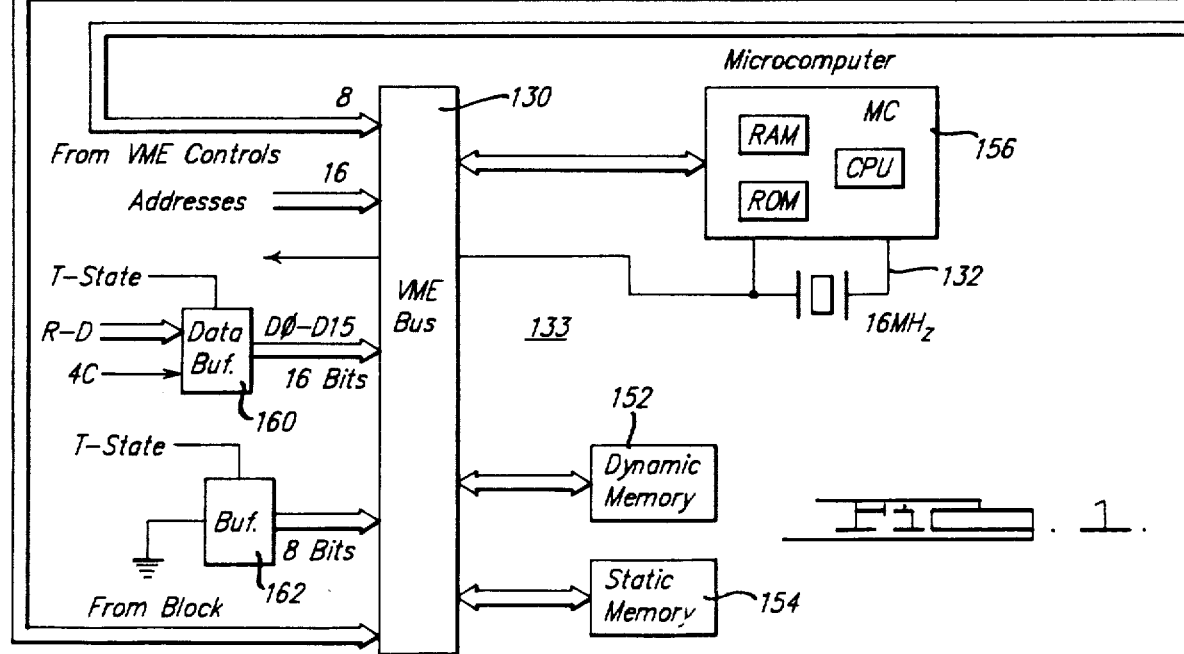

Referring to FIG. 1, there is shown the serial data direct memory access module 22 of this invention. Illustratively, serial data in the form of digital light signals is transferred over a fiber optic cable 24 and enters memory module 22 through the optic receiver 100. The data which is sent over cable 24 is in a Manchester encode format. The Manchester encoding is used since this form of encoding eliminates the need for the customary clock signal wires as it includes both clock and data in a single data stream. The data stream is a series of 17 bit words comprising an initial START bit followed by four operational bits and 12 information bits. The protocol of the data communicates over cable 24 to module 22 dictates that each frame of the 12 information bits be identified by the four bit operational codes. In this embodiment, circuits of module 22 are designed to address the four operational codes and use the codes to route the frames of information in a chosen manner that enables capturing the transient responses of the reactions that are depicted by the information transmitted over cable 24. It should be recognized by those familiar with communication data control protocols that the protocol for the present system is not a complex set of rules and does not include messages with a header field specifying destination and source address bytes or bits that need to be decoded nor do the messages contain error or bit checking codes. The clock rate is illustratively 12 MHz. Module 22 may be configured to accept other data transmission codes such as nonreturn-to-zero (NRZ) and NRZ-inverted.

Other serial transmission media may be used instead of optical light signals.

Memory module 22 includes a receiver circuit 90 that includes means for direct memory access to a static or a dynamic memory 154 and 152, respectively, via a VME bus 130 of a VME bus computer system 133. VME bus system 133 includes microcomputer 156 and dynamic and static memories 152 and 154, respectively. Optical receiver converts the light signals sent through cable 24 to digital electrical signals. Cable 24 illustratively is a signal graded index glass fiber core cable such as a ruggedized type HFBR-3200 Simplex Fiber Optics Cable of Hewlett-Packard.

The digitized signal from receiver 100 is applied to a Manchester decoder 102. Decoder 102 regenerates a synchronous clock signal the serial bit representation of the data words. The clock signal and the serial data words are transferred to a start bit conuter 104. Counter 104 is used to count the bits looking for a start bit and to latch in the succeeding 16 data bits.

At the 17th clock pulse 05 of counter 104, a "LOAD" signal issues which causes the serial data to enter a serial to parallel shift register 106 and to be clocked by the decoded clock signals.

Shift register 106 reconverts the serial words representations of the input data into parallel words comprised of illustratively 12 data bits and 4 code bits. One of the code bits may be used to identify which BANK of the transmitter, if the transmitter has more than one BANK, was used for transferring the data words to the receiver. The three operational code bits which define the status of each frame of the 12 information bits is bussed to decoder/demultiplexer 108. The "BANK" bit is routed to decode latch 100 where it is used for clocking latch 110 so as to generate a signal to enable decoder 108. When decoder 108 is enabled the 3-bit code is decoded and either one of the seven circuits indicator circuits is activated, illustratively FAULT latch 112, PRECOND Latch 114, EVENT indicator 116, PRE CAL Latch 118, CAL indicator 120; POST CAL Latch 122 and DMA Latch 124.

The LOAD signal is also used to clock a sequencer latch 126 so as to to generate clock pulses. Sequencer 128 counts a 16 MHz clock frequency signals from a VME bus clock generator 132 for computer 156. Computer 156 is the master computer for the bus system.

The first CLOCK pulse (Q1) is a RESET-1 signal which clears roll latch 134. Roll latch 134 is used to indicate when memory is full and the system must roll back to the beginning. Latch 134 stays clear until memory full occurs. RESET-1 also is used to set decode latch 110 to begin sequence of decoding the next code bits for the next data word. The second clock pulse (Q2) clocks the write latch 136 which provides a CH ADV signal which enables CH ADVANCE counter 138 and VME counter 139.

When counter 138 counts out and its last clock pulse enables scan address counter 140. The combined output pulses from counters 138 and 140 are bussed to address buffer 142 to form a 16-bit address of the memory location for the data word that is to be placed in memory. Address buffer 142 transfers the 16-bit address into the address bus of the VME bus 130 under the command of a TRI-STATE signal issued from DMA Latch 124.

When scan address counter 140 advances to its last counter, the final clock pulse is used to enable a presettable BLOCK address up/down counter 144 used to identify which block of memory the newly addressed data will be placed in. Illustratively, the amount of data memory is expressed in terms of blocks. A block is defined as 2048 words (4096 bytes) of memory for one (1) channel. Illustratively, for 32 channels of input data, one (1) block would amount to 2048×32 or 65536 words (131072 bytes) of memory. The digital number from counter 144 identifying which block of memory is to be used is bussed to block buffer 146 and then on to the address bus of the VME bus 130 under Tri-State command.

The pre-condition code latch 114 is used to help make memory module 22 more noise resistant. A precondition bit is issued with PRECAL, POST CAL and DMA commands to prevent spurious signals from entering these circuits.

The addresses generated within module 22 are used to address module 156, dynamic RAM memory 152 and static RAM memory 154. These memories can be increased in size or decreased in size. The static RAM memory 154 is used as data memory and can be used with a battery back-up for data retention. Dynamic RAM memory 152 provides onboard refresh logic.

There are, illustratively 16 megabytes of address space of memory but only 6 megabytes are reserved for data memory starting at for example $800000. The amount of memory to be used can be varied. A maximum memory switch 148 can be set for the amount of memory installed. Selections are provided for, illustratively, 0.5, 1, 2, 4 and 6 megabytes of installed memory. The switches must not be set for more memory than is installed, although they could be set for less than the installed amount of memory.

As mentioned supra, WRITE latch 136 provides a CH ADV signal, when the second clock pulse (Q2) from sequencer 128 changes from a high to a low level.

When, illustratively, a CH ADV signal occurs, VME counter 139 is enabled. With latch 136 set as a result of the Q2 clock pulse, the VME buffer 158 is activated initiating a WRITE pulse. Then the VME bus computer system 133 communicates its own signals over the bus to the receiver circuit such as IACK-interrupt acknowledge, DACK-data acknowledge, AS-ADDRESS strobe, SYS CLK—System clock. If a DACK is not received from the bus computer system 133 at the fifth clock pulse (Q5) from VME counter 139, this Q5 pulse will be used to generate a reset signal to reset latch 136. Latch 136 is essentially used to initiate writing to memory. When the fifth clock pulse (Q5) of counter 139 occurs, the DMA latch 124 sets providing a T-state or Tri-state signal for the system and a LOCK signal to return control back to the CPU of MC 156.

The data word from shift register 106 is bussed to DATA buffer 160 and then onto the data bus of the VME bus 130. To permit modifying an address, an address modifier buffer 162 under control of the tri-state signal is used.

DMA ACCESS

For direct memory access (DMA) circuits of memory module 22 to grasp control of the bus, a form of bus arbitration is employed. A code from decoder 108 is issued to the CPU of MC 156 requesting use of the bus. The DMA circuits wait for a response from the CPU of computer 156. The CPU finishes what it is doing then it gives up control and goes to sleep. The receiver DMA circuits of module 22 sends a signal to the VME bus system 133 that it has control. When control is returned to the CPU, the CPU resumes its function from where is left off prior to going to sleep.

A direct memory access (DMA) is in effect whenever the DMA indicator 150 is lit. This occurs, illustratively, when coded bits are transmitted to memory module 22, illustratively, via fiber optic cable 24 indicating the status of each word. Illustratively, a code may be sent to indicate pre cal data, event data or post event data, post cal data. Upon completion of a chosen period of data collecting, further transmission is stopped. Illustratively, at the end of post-cal data transmissions, the receiver circuit of module 22 will give up control of the system and return control to the CPU of the VME bus.

Operation of the system will now be described.

Assume transient response data of an impact of a vehicle with a barrier during a crash test is to be stored in the memory of system 133. Message data from the crash test site is sent to memory module 22 via fiber optics cable 24.

Memory module 22 operates either under the control of the input codes received over cable 24 or under the control of the CPU in computer module 156 of the VME bus computer system 133. The computer module 156 is the master computer for the VME bus and maintains primary control of the bus.

When the memory module wants control of the bus, a form of bus arbitration occurs. Module 22 must send a bus request signal to MC 156 and MC 156 must sent back a not busy code. To initiate the bus request, protocol of the received message must be such that an arbitrator circuit 125 in module 22 is enabled. The following sequence of messages must be sent to module 22 to enable circuit 125. Initially, a precondition code (the 15th, 14th and 13th bits of the message word being low, high and high, i.e. L,H, and H respectively) along with the 12th bit, the BANK bit being H, followed by another precondition code with a L-BANK bit, followed by a DMA code (LHL) and a H-BANK bit followed by another DMA code with a L-BANK bit is needed to activate the arbitration circuit 125.

These codes are sent as light signals over cable 24 to optical receiver 100 in sequence for conversion to digital electrical signals. The digital signals are routed to Manchester decoder 102. Decoder 102 regenerates the synchronous clock signal inherent with the Manchester coded message and reconstructs the serial bits of the 17 bit message. The serial bits and the clock signal are routed to both the START bit counter 104 and shift register 106. Counter 104 counts the serial bits looking for a START bit while register 106 is shifting the series of bits through its stages. At the 17th clock pulse (Q5), counter 106 issues a LOAD signal to register 106 and to sequencer latch 126.

The LOAD signal is used by register 106 to latch in the 17 bits of the message word and is use to change the state of latch 126. Latch 126 alternately changes state for each word that is latched in register 106.

The H-BANK bit of the first precondition code word that is latched in register 106, causes decode latch 110 to initiate storing the precondition codes in decoder/multiplexer 108. The L-BANK bit of the next precondition code word causes latch 110 to change state which enables the output of decoder/multiplexer 108. The precondition code sets precondition latch 114 which in turn provides a signal which enables DMA latch 124. A similar operation occurs for the succeeding two DMA codes to set the DMA latch 124 which provides a signal to the arbitrator circuit 125 which issued the BUS REQUEST signal.

The BUS REQUEST signal from circuit 125 travels over the VME control bus to MC 156. The CPU of MC 156 finishes up any current tasks then gives up control of VME bus 130 to memory module 22 and then goes to sleep. Control is given up when MC 156 issues a NOT BUSY and a NOT ADDRESS STROBE signal to DMA latch 124 of memory module 22. Latch 124 issues a low T-STATE signal and a ROLL enable signal. The low T-STATE signal activates various devices of module 22; a high T-STATE signal causes the devices to float. The devices are placed in a floating state when MC-156 has control of the VME BUS. Module 22 is now in the DMA mode.

Once the DMA mode is established, PRECAL code data normally is sent to memory module 22. After the START bit of the PRECAL words are detected by START bit counter 104, sequencer latch 126 is flipped alternately on and then off creating a clock signal that clocks on and off sequencer 128. Sequencer 128 counts the pulses of the 16 MHz clock of the VME bus clock generator 132 used by MC 156.

The first clock pulse (Q1) from sequencer 128 is a RESET-1 signal which resets roll latch 134 and sets decode latch 110 so as to begin a sequence of decoding the next code bits of the next data words. The second clock pulse (Q2) sets the write latch 136 which provides a CH ADV signal to enable CH ADV counter 138. When counter 138 counts out, the last clock pulse enables scan address counter 140. The combined output pulses from counters 138 and 140 merge in address buffer 142 forming a 16-bit address of the memory location for the PRE CAL word. The address is bussed from buffer 142 to VME bus 130.

When the scan address counter 140 advances to its last register, the final clock pulse enables BLOCK up/- down counter 144 which issues a bussed signal that identifies which block of memory the data should be placed. PRE CAL data is placed in block 1 and all succedding data is placed in block 2 and all the remaining blocks of memory selected to receive data.

Also with the occurrence of the CH ADV signal from the WRITE latch 136, VME counter 139 turns on. The VME buffer 158 which interfaces counter 139 initiates a WRITE pulse which is bussed to the VME bus 130.

Following the storage of the PRE CAL data, RESET PRE CAL code (LLL) words access the VME bus for storage in block 2 and the remaining blocks of memory selected for storage. RESET PRE CAL data is continuously sent to memory as sample data. This sample data is sent even when previously stored data in blocks 2 and the remainder of memory is written over several times. Writing over continuously stored data occurs and continues until event code (HLL) data which is the transient response data appears. It should be appreciated by those skilled in the art that contrast to other DMA systems which deal primarily with data transfers of finite length, that the product of this invention works with transmissions of infinite lengths. This is so since it isn't known exactly when the transient responses of the impact will occur and since pre-impact data must be stored, interrupting the transmission of data samples for an ID WORD, PREAMBLE, etc cannot be tolerated.

POST CAL data isn't always sent after an event. But if POST CAL data is needed, then the transmission of data to module 22 is stopped for 10 seconds prior to sending the PRE CAL data.

After the critical data is stored in memory, module 22 issues a 68K code to the CPU of MC 156 to signal the relinquishing of control of the VME bus 130. MC 156 normally sends back to module 22 a DACK signal which is gated with an output signal from VME counter 139 to provide a reset signal to write latch 136. If the DACK signal is not sent, VME counter 139 times out and issues an ERROR signal which resets latch 136 and causes fault latch 112 to cycle on and off causing a fault light to blink off and on indicating a fault with the memory module. The fault light remains constantly on when there is a fault with data sent to module 22.

What is claimed:

1. A method for storing transient response data derived from rapidly changing physical phenomena, said data being in the form of serial digital numbers, said method includes the steps of:
   (a) adding a predetermined number of code bits to each of said digital numbers to form a digital word having a START bit, a select number of operational bits and a frame of information bits, said digital word providing a particular protocol for processing transient response data;
   (b) adding a clock signal of a chosen frequency to each of said data words;
   (c) encoding each of said serial words and said added clock signal into a chosen code format suitable for data transmission;
   (d) transmitting each of said encoded serial words and clock signal as digital light signal stream over a fiber optic cable to an optical receiver, said optical receiver being capable of receiving the light signal stream transmitted over said optical fiber cable;
   (e) at said digital receiver, converting said digital light signal stream transmitted over said fiber optics cable into a reconstructed encoded serial digital electric signal data stream;
   (f) decoding said serial digital electric signal data stream so as to reconstruct each of said serial digital data words and said added clock signal;
   (g) counting each bit in each of said serially presented word to detect said START bit to provide an indicating of a sufficient number of bits for forming a message word;
   (h) sequentially shifting each bit of said serial digital electric signal data onto parallel output lines at the reconstructed added clock rate;
   (i) latching at said parallel output lines the sufficient number of serial bits of said data stream in response to the indication of the START bit to reconstruct each of said data words which form a message word;
   (j) providing a direct memory access computer bus system comprised of a master computer, an interface bus, and static and dynamic memories;
   (k) providing a control circuit capable of sharing control of said interface bus with said master computer, said control circuit being responsive to each of said message words in controlling directly accessing said memories of said bus system;
   (l) providing a message word used in conjunction with subsequent critical message words needed for operating said control circuits for preventing erroneous messages being employed to operate said control circuit;
   (m) providing a critical message word used to operate said control circuit so as to arbitrate with said master computer for control over said interface bus;
   (n) decoding each of said operational code bits of each word so as to operate said control circuit in either a pre-DMA mode, a DMA mode or a post DMA mode;
   (o) after gaining control over said interface bus, forming an address word which is added to each of said data words for providing an address location in the memories of said computer memory system for each of said message words that is stored in memory.
   (p) designating block locations of memory for storing designated forms of message words;
   (q) writing a plurality of sample data words into memory address and block locations corresponding to the locations designated by each of said formed address words and the designated blocks, the writing of said sample data words being such as to exhort the memory locations causing over writing of the data in memory locations specified to receive the sample data;
   (r) writing the transient response data in memory in a manner preventing the overwrite of such data; and
   (s) after said control circuit finishes controlling accessing the memories via said interface bus, relinquishing control of said interface bus to said master computer.

2. The method of claim 1 which includes rolling said sample data message words in and out of said memories in a loop.

3. The method of claim 1 which including distinguishing faults in said control circuit from faults in the device transmitting said message words to said control circuits.

4. A system for storing transient response data derived from rapidly changing physical phenomena, said data being in the form of serial digital numbers, said system comprises:

(a) means for adding a predetermined number of code bits to each of said digital numbers to form a digital word having a START bit, a select number of operational bits and a frame of information bits, said digital word providing a particular protocol for processing transient response data;

(b) means for adding a clock signal of a chosen frequency to each of said data words;

(c) means for encoding each of said serial words and said added clock signal into a chosen code format suitable for data transmission;

(d) means for transmitting each of said encoded serial words and clock signal as digital light signal stream over a fiber optic cable to an optical receiver, said optical receiver being capable of receiving the light signal stream transmitted over said optical fiber cable;

(e) at said digital receiver, means for converting said digital light signal stream transmitted over said fiber optics cable into a reconstructed encoded serial digital electric signal data stream;

(f) means for decoding said serial digital electric signal data stream so as to reconstruct each of said serial digital data words and said added clock signal;

(g) means for counting each bit in each of said serially presented word to detect said START bit to provide an indicating of a sufficient number of bits for forming a message word;

(h) means for sequentially shifting each bit of said serial digital electric signal data onto parallel output lines at the reconstructed added clock rate;

(i) means for latching at said parallel output lines the sufficient number of serial bits of said data stream in response to the indication of the START bit to reconstruct each of said data words which form a message word;

(j) means for providing a direct memory access computer bus system comprised of a master computer, an interface bus, and static and dynamic memories;

(k) means for providing a control circuit capable of sharing control of said interface bus with said master computer, said control circuit being responsive to each of said message words in controlling directly accessing said memories of said bus system;

(l) means for providing a message word used in conjunction with subsequent critical message words needed for operating said control circuits for preventing erroneous messages being employed to operate said control circuit;

(m) means for providing a critical message word used to operate said control circuit so as to arbitrate with said master computer for control over said interface bus;

(n) means for decoding each of said operational code bits of each word so as to operate said control circuit in either a preDMA mode, a DMA mode or a post DMA mode;

(o) after gaining control over said interface bus, means for forming an address word which is added to each of said data words for providing an address location in the memories of said computer memory system for each of said message words that is stored in memory;

(p) means for designating block locations of memory for storing designated forms of message words;

(q) means for writing a plurality of sample data words into memory address and block locations corresponding to the locations designated by each of said formed address words and the designated blocks, the writing of said sample data words being such as to exhort the memory locations causing over writing of the data in memory locations specified to receive the sample data;

(r) means for writing the transient response data in memory in a manner preventing the overwrite of such data; and (s) after said control circuit finishes controlling accessing the memories via said interface bus, means for relinquishing control of said interface bus to said master computer.

5. The system of claim 4 which includes means for rolling said sample data message words in and out of said memories in a loop.

6. The system of claim 4 which includes means for distinguishing faults in said control circuit from faults in the device transmitting said message words to said control circuits.

* * * * *